United States Patent [19]

Saner

[11] Patent Number: 4,703,816

[45] Date of Patent: Nov. 3, 1987

[54] MASS-MEASURING AND FORCE-MEASURING DEVICE

[75] Inventor: Kaspar Saner, Dübendorf, Switzerland

[73] Assignee: K-Tron Patent AG, Zurich, Switzerland

[21] Appl. No.: 841,956

[22] Filed: Mar. 20, 1986

[30] Foreign Application Priority Data

Mar. 25, 1985 [EP] European Pat. Off. ...... 85 810 127.2

[51] Int. Cl.$^4$ .................. G01G 3/08; G01G 21/24
[52] U.S. Cl. .................. 177/229; 177/255; 177/DIG. 9
[58] Field of Search .................. 177/229, 255, DIG. 9

[56] References Cited

U.S. PATENT DOCUMENTS

| | | |
|---|---|---|
| 3,148,742 | 9/1964 | Giulie . |
| 3,387,679 | 6/1968 | Giulie et al. .................. 177/229 X |
| 3,423,999 | 1/1969 | Wirth et al. . |
| 4,088,198 | 5/1978 | Wirth et al. . |
| 4,163,386 | 8/1979 | Gallo et al. . |
| 4,240,289 | 12/1980 | Saner . |
| 4,270,384 | 6/1981 | Saner et al. . |
| 4,461,364 | 7/1984 | Strickler .................. 177/DIG. 9 |
| 4,544,858 | 10/1985 | Nishiguchi et al. . |

Primary Examiner—George H. Miller, Jr.
Attorney, Agent, or Firm—Parkhurst & Oliff

[57] ABSTRACT

A mass-measuring and force-measuring device which comprises a frame, a load-bearing component guided at right angles and parallel, a pathless measuring system and means for transmitting the load to the measuring system, which possess a lever which is connected to the frame via a first plate having at least one joint and non-rotatably and non-displaceably mounted on the said lever, and is connected to the load-bearing component via a second non-rotatably and non-displaceably mounted plate having at least two joints.

12 Claims, 7 Drawing Figures

U.S. Patent    Nov. 3, 1987    4,703,816
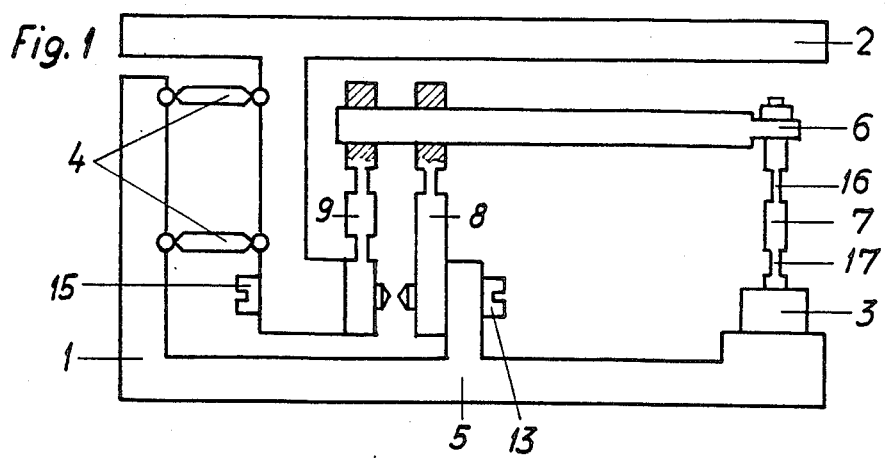
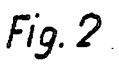 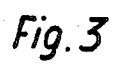 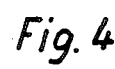 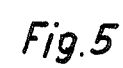
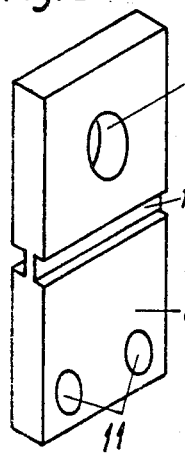 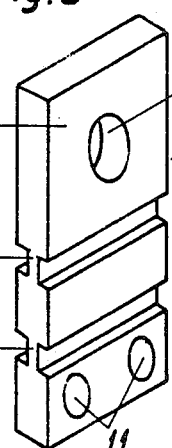 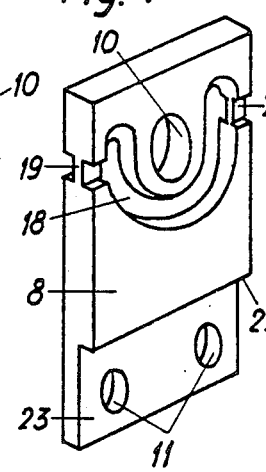 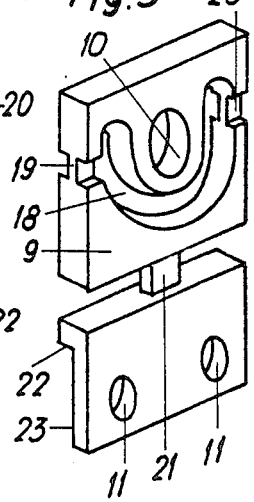
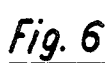 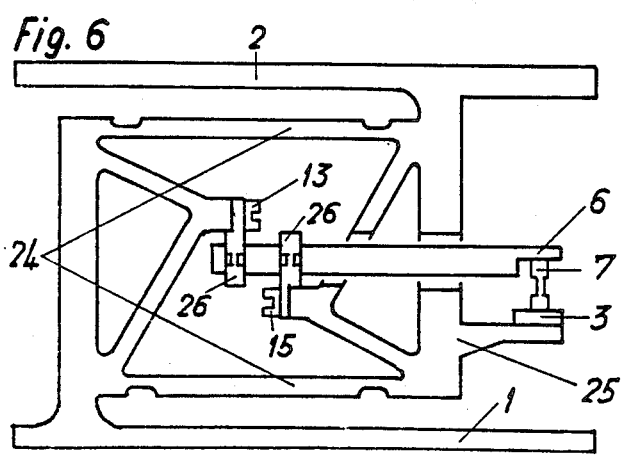 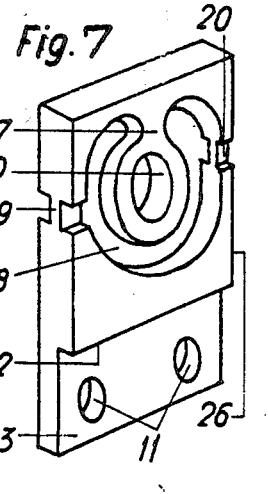

MASS-MEASURING AND FORCE-MEASURING DEVICE

The present invention relates to a mass-measuring and force-measuring device comprising a frame, a load-bearing component running at right angles and parallel, a pathless measuring system and means for transmitting the load to the measuring system. Such devices, which are also referred to as tied balances, are disclosed in, for example, U.S. Pat. No. 3,423,999. If, in such devices, the measuring system is removed, they form a kinematic system with a single degree of freedom. A pathless measuring system is one in which the movement permitted by the measuring system is virtual. Such measuring systems consist, for example, of at least one vibrating string or one wire strain gage and electronics suitable for the purpose.

The means for transmitting the load to the measuring system generally possess at least one lever which, in transmitting the force, reduces it. Such a lever is disclosed in, for example, U.S. Pat. No. 4,088,198. The classical knife edges and blade-bearing recesses of the known lever apparatuses, which permit large rotational movements, are generally replaced in tied balances by resilient joints, such as universal joints and band joints. For a given input load, such elements must permit a very short input arm of the reducing lever without diminishing the quality, i.e. the precision of transmission or the reduction ratio.

The object of the invention is to provide elements which permit medium-sized or even small, commercially acceptable production series.

This object is achieved, according to the invention, if these means possess a lever which is connected to the frame via a first plate which has at least one joint and is mounted non-rotatably and non-displaceably on the said lever, and is connected to the load-bearing component via a second plate which has at least two joints and is mounted non-rotatably and non-displaceably.

The attached drawing schematically illustrates examples of the subject of the invention.

FIG. 1 shows a first embodiment,
FIG. 2 and 3 each show a plate,
FIG. 4 and 5 each show a version of FIG. 2 and 3,
FIG. 6 shows a second embodiment, and
FIG. 7 shows the plate of the embodiment according to FIG. 6.

FIG. 1-3 show a first example. The device has a frame 1, a load-bearing component 2, and a measuring system 3 fastened on the frame 1. The load-bearing component is guided parallel and at right angles by means of connecting rods 4. A lever 6 is pivotably mounted on a support 5 of the frame 1. At its left-hand end, the lever 6 is connected to the load-bearing component 2. It acts on the input of measuring system 3 via a stilt 7 fastened to its right-hand end.

The lever 6 is provided with two plates 8 and 9. The plate 8 (FIG. 2) consists of a flat, essentially rectangular plate which has an upper hole 10, two lower holes 11, preferably provided with a thread, and two horizontal grooves which form a vertical band joint 12. The plate 8 is mounted non-rotatably and non-displaceably, i.e. by means of a so-called press fit, via the hole 10, on the lever 6. The said plate is fastened to the support 5 of the frame 1 by means of screws 13. The plate 9 (FIG. 3) has the same form as the plate 8 but possesses a second band joint 14. The distance from the band joints 12 to the center of the hole 10 is the same for both plates 8 and 9. The plate 9 sits non-rotatably and non-displaceably on the lever 6. The said plate is fastened to the load-bearing component 2 by means of screws 15.

The stilt 7 has two narrower sections 16 and 17, each of which forms a joint. The said stilt is fastened at its upper end to the lever 6, and at its lower end to the input of the measuring system 3. It thus acts as a tie bar. The narrow section 16 is arranged so that its distance from the longitudinal axis of the lever 6 is the same as the distance of the band joint 12 from the center of the hole 10.

The device described functions as follows. If a mass is placed on the load-bearing component 2, its weight is transmitted via the plate 9 to the lever 6, the said plate acting as a traction element. The band joint 12 acts as a primary joint, and the band joint 14 acts as a secondary joint. The lever 6 is pivoted about the band joint 12 of the plate 8. It is clearly understood that this is a virtual rotation. The stilt 7 transmits the so-called sensed force to the measuring system 3. The narrower section 16 acts as a primary joint, and the narrower section 17 as a secondary joint.

FIG. 4 and 5 illustrate a version of the embodiment of the plates according to FIG. 2 and 3. A semicircular slot 18 is provided at the upper end of the plates 8 and 9. Two horizontal grooves which form two band joints 19 and 20 are provided on each of the two sides of the slot 18. This pair of band joints 19 and 20 corresponds to the band joint 12 of FIG. 2 and 3, but is located in the horizontal plane through the longitudinal axis of the lever 6. The second band joint 14 of plate 9 in FIG. 3, which joint acts as a secondary joint is replaced, in the embodiment of FIG. 5, by a tongue-shaped band joint 21 which has greater flexibility in respect of bending and torsional moments.

The lower part of the two plates 8 and 9 shown in FIG. 4 and 5 is reduced to half the thickness from the shoulder 22 onward. The plane 23 of these lower parts runs through the middle of the band joints 19 and 20, or 19, 20 and 21. The plates 8 and 9 can of course be interchanged.

FIG. 6 shows an example in which the load-bearing component 2 is guided at right angles and parallel by means of parallel connecting rods 24. The measuring system 3 is fastened to an arm 25 of the load-bearing component 2. The lever 6 is provided with two plates 26. It is connected to the frame 1 by means of the first plate 26. It is connected to the load-bearing component 2 via the second plate 26. In this example, both plates 26 are identical. The right-hand end of the lever 6 (as viewed in FIG. 6) is connected to the measuring system 3 via a stilt 7 which is illustrated schematically and acts as a pressure rod.

FIG. 7 shows the plate 26. In the case of the plate 26, the slot 18 of the embodiment according to FIG. 4 and 5 is no longer semicircular but virtually completely circular, so that the resulting tongue 27, which acts as a primary joint, has a width which essentially corresponds to the thickness of the plate 26. The slot 18 and the hole 10 are concentric. The remaining elements are as described in connection with FIG. 4. The tongue 27 could, if necessary, also be in the form of the joint 21 (FIG. 5), i.e. thinner than the plate 26 itself.

In this embodiment of the plates 26, the primary joints formed by the tongue 27 thus lie outside the horizontal plane through the axis of the lever 6, while the pair of secondary joints 19 and 20 lie in this plane. Both plates 26 may be regarded as resilient traction elements having the same transverse flexibility. The skilled worker can readily calculate that elongation of the parallel connecting rods 24 essentially has no effect on the transmission ratio. This embodiment is advantageous where it is necessary for the entire device to have a small height.

In the examples described, the band joints 12, 14, 19 and 20 lie in the middle plane of the plates. However, they can also be located in a position displaced from this plane, permitting a further reduction in the length of the effective input arm of the lever 6.

I claim:

1. A mass-measuring and force-measuring device comprising: a frame, a load-bearing component guided at right angles and parallel, a pathless measuring system and means for transmitting a load to the measuring system, wherein the means for transmitting includes a lever being connected to the frame by a first plate having at least one joint and being connected to the load-bearing component by a second plate having at least two joints, wherein each of said first and second plates includes a first hole penetrated by the lever, whereby the lever and each first hole form a press-fit connection, and whereby each of said first and second plates are connected, non-rotatably and non-displaceably, to the lever.

2. A mass-measuring and force-measuring device as claimed in claim 1, wherein each plate includes at least one second hole for fastening said plate.

3. A mass-measuring and force-measuring device as claimed in claim 2, wherein the first plate includes a single horizontally arranged band joint.

4. A mass-measuring and force-measuring device as claimed in claim 3, wherein the second plate includes two parallel, horizontally arranged band joints.

5. A mass-measuring and force-measuring device as claimed in claim 1, wherein each of said joints comprises a band limited at least on one side of the plate by a horizontal groove and having, measured in the longitudinal direction of the lever, an extension smaller than the portions of the plate adjacent to the band, and an extension smaller than the hole penetrated by the lever.

6. A mass-measuring and force-measuring device as claimed in claim 5, wherein each of said bands is limited by a pair of horizontal grooves arranged opposite to each other in the plate.

7. A mass-measuring and force-measuring device as claimed in claim 1, wherein each of said holes penetrated by the lever has circular cross-section.

8. A mass-measuring and force-measuring device as claimed in claim 1 wherein the lever is connected with said frame only by the first plate and wherein the lever is connected with said load bearing component only by the second plate.

9. A mass-measuring and force-measuring device comprising: a frame, a load-bearing component guided at right angles and parallel, a pathless measuring system and means for transmitting a load to the measuring system, wherein the transmitting means include a lever which is connected to the frame by a first plate having at least one joint non-rotatably and non-displaceably mounted on said lever, and being connected to the load-bearing component by a second plate having at least two joints, and being non-rotatably and non-displaceably mounted on said lever;

wherein each plate includes a first hole for holding the lever and at least one second hole for fastening said plate; and wherein both plates include a slot extending around the first hole through at least 180°, and said plates are provided with a pair of band joints having a common horizontal axis running through the center of the first hole, and lieing in the horizontal plane through the axis of the lever.

10. A mass-measuring and force-measuring device as claimed in claim 9, wherein the second plate has a second tongue-shaped joint.

11. A mass-measuring and force-measuring device as claimed in claim 10, wherein the second joint is located outside the horizontal plane through the axis of the lever and acts as a primary joint.

12. A mass-measuring and force-measuring device as claimed in claim 10, wherein the second joint lies outside the horizontal plane through the axis of the lever and acts as a secondary joint.

* * * * *